(12) United States Patent
Lawson (10) Patent No.: US 7,802,804 B1
(45) Date of Patent: Sep. 28, 2010

(54) WOBBLE-BEARING AXLE ASSEMBLY FOR VELOCIPEDES AND EXERCISE MACHINES

(76) Inventor: John Lawson, 2118 Wilshire Blvd., Santa Monica, CA (US) 90403

( * ) Notice: Subject to any disclaimer, the term of this patent is extended or adjusted under 35 U.S.C. 154(b) by 225 days.

(21) Appl. No.: 12/215,808

(22) Filed: Jun. 30, 2008

(51) Int. Cl.
*B62M 1/14* (2006.01)
*B62M 5/00* (2006.01)
*B62M 3/00* (2006.01)

(52) U.S. Cl. .................. 280/244; 280/260; 280/261; 280/262; 280/233; 280/253; 280/89.12; 301/127; 301/124.2; 301/2.5; 74/594.1; 384/431

(58) Field of Classification Search ............... 280/244, 280/89.12, 260, 261, 262, 233, 253; 301/127, 301/124.2, 2.5; 74/594.1; 384/431
See application file for complete search history.

(56) References Cited

U.S. PATENT DOCUMENTS

| | | | | |
|---|---|---|---|---|
| 282,938 A * | 8/1883 | Warner | ........................ | 74/143 |
| 5,236,248 A * | 8/1993 | Chen | ........................ | 301/2.5 |
| 5,442,972 A * | 8/1995 | Hoover | ........................ | 74/65 |
| 5,499,834 A * | 3/1996 | Pasin et al. | .................. | 280/282 |
| 6,019,435 A * | 2/2000 | Bach | ........................ | 301/105.1 |
| 6,074,014 A * | 6/2000 | Li | ........................ | 301/2.5 |
| 6,688,623 B1 * | 2/2004 | Yunaska | ..................... | 280/233 |

* cited by examiner

*Primary Examiner*—Lesley Morris
*Assistant Examiner*—Marlon A Arce
(74) *Attorney, Agent, or Firm*—Andrew Y. Schroeder; Law Office of Andrew Schroeder (57) ABSTRACT

The wobble bearing axle assembly is used for engaging the upper body of a person for use in human powered vehicles and exercise equipment. The wobble bearing assembly converts linear input force derived by the operator into rotational force, which is directed toward the forward propulsion of a wheel.

The wobble bearing axle assembly comprises a wobble bearing, a wobble axle, at least two engagement members a first arm and a second arm. The wobble bearing is disposed upon the oblique retainer of the wobble axle. The oblique retainer of the wobble axle is angled offset from the axis of the wobble axle Y. The engaging members are rotatably affixed with the first and second arms through pins which is longitudinally disposed through complementary orifices through the first and second arms and the engaging members respectively. In some preferred embodiments additional bearings are engaged with the pedals powered by the legs of the operator.

5 Claims, 12 Drawing Sheets

WOBBLE-BEARING AXLE ASSEMBLY FOR VELOCIPEDES AND EXERCISE MACHINES

FIELD OF THE INVENTION

The present invention relates with human powered vehicles and more specifically relates with an axle which enables environmentally friendly human powered vehicles to access more power.

BACKGROUND OF THE INVENTION

Prior to the early 1930's the bicycle and the horse had been the principal means of transportation for human civilization. As technology advanced automobiles, airplanes, engine-powered boats, and trains became the cornerstones of modern transportation. These emerging means of transportation brought forth fast and efficient connections between cities, states, and countries. They also enabled working class people to live many miles away from their jobs and still have time to spend with the family. And they enabled the old and infirm a means of becoming self-sufficient without having to curtail their desired daily routines.

However, these transportation vehicles have come with many unintended consequences. One problem in recent years has been the increasing exhaustion of oil and its attendant rise in prices. Another related problem has been the byproducts generated by its use in combustion engines. The use of gasoline and other fossil fuels create greenhouse gases which many scientists believe is contributing to Global warming. As more Carbon Dioxide is released into the atmosphere, heat produced by UV radiation by the sun is not able to release from Earth's atmosphere as readily as before the 1930's. What's more, many other particulates released from the combustion of fuel contribute to the degradation of the Ozone layer which further exacerbates global warming.

Another problem which will only worsen in the coming years is traffic congestion. The popularity of automobiles has become so great in many metropolitan cities that its very use is beginning to militate against its primary advantage of speed. The main problem lies in the fact that cities simply cannot build enough roads to accommodate the exponential growth of new automobiles on the road. In point of fact, currently the average speed of an automobile in Los Angeles is near 33 miles per hour. It is estimated that in around 15 years the average speed of a vehicle in Los Angeles will drop to around 22 miles per hour.

Fortunately, new technologies and other advances have breathed new life to bicycles and other human powered vehicles by making them much faster. Since the 1930's several human powered vehicles have attained speeds heretofore believed to be impossible. Currently, the land speed record for an unassisted, flat surface human powered vehicle is 80.55 miles per hour, over 10 miles per hour faster than speed limits on interstate highways. The land speed record for an assisted bicyclist is 167 miles per hour.

Moreover, advances in human powered vehicles are not just confined to land. Today, there are human powered aircraft, which can attain speeds of 25 miles per hour. Other human powered vehicles include hydrofoils and submarines.

Human-powered vehicles offer several advantages over engine or motor propelled vehicles. One of the obvious advantages is that they are environmentally friendly. Since they are completely powered by humans, harmful gases are not released into the atmosphere as with automobiles. Another advantage is cost savings. As gas prices continue its upward ascent, many people will inevitably be priced out of vehicle use and ownership. Another advantage is the fact that unlike large vehicles, most human powered vehicles are relatively small in size. Therefore, roads and other thoroughfares can safely handle a very large concentration of bicycles thereby relieving traffic congestion and long commuting times.

However, there are some drawbacks and heretofore-unrealized opportunities for human powered vehicles. The most obvious drawback is the fact that their propulsion is derived from humans. Whereas most automobiles can deliver over 150 horsepower, human powered vehicles are limited to less than one horsepower. Unfortunately, most human-powered vehicles such as the human powered aircraft require a great deal of physical exertion for takeoff. For many people who are not physically robust, their muscles simply cannot transmit the requisite power for takeoff. And with long wheel base recumbent bicycles, ascending up hills is very difficult.

One way to overcome this lack of power is to tap into another potential source of human power, the upper body. The upper body comprises the pectoral muscles, the abdominal muscles, the deltoids, triceps, and biceps. Although the upper body can generate only a fraction of the power of the lower body, the power supplied by the upper body is just enough to overcome the most commonly occasioned difficulties. If one could access approximately 20-30% more power for takeoff or for ascending a steep hill with their upper body, the use of human powered vehicles would become more feasible and accessible to many people of all kinds of fitness levels.

Another related deficiency in a similar field involves exercise equipment, specifically recumbent exercise bicycles with an upper body exercise apparatus. Although it is desirable to engage more muscle groups during a workout, some people may not desire to engage their upper body during exercise. Some people may prefer to read a newspaper while propelling the pedals with their legs. Unfortunately, many of these exercise machines do not provide for a disengagement mechanism for the upper body exercise apparatus from the lower body exercise apparatus. For this reason, the arm levers will continue to sway back and forth regardless of whether the person does not desire to work out her upper body. In addition, if one desires to read a book while working out on such exercise apparatus, the swaying lever bars can be an annoyance.

Therefore, what is needed in the art is a means of accessing power from the upper body and transmitting this extra power into a human powered vehicle. By augmenting power for propulsion, human powered vehicles will become more feasible, especially in those instances requiring an extra burst of power and energy. Furthermore, what is needed in the art is an exercise apparatus which provides a disengagement mechanism which can make the upper body workout optional for some people.

SUMMARY OF THE INVENTION

It is the object of the present invention to overcome the deficiencies and shortcomings of the prior art and provide an apparatus which augments power for the propulsion of human powered vehicles. Power will be augmented through use of the upper body. Because most human powered vehicles do not use the upper body for forward propulsion but only for steering, the upper body is an ideal source of an extra burst of power for most human powered vehicles. To access the power from the upper body, a wobble-bearing axle is used in order to enable an upper-body propulsion apparatus to be used with a plurality of various human powered vehicles.

It is an object of the present invention to provide a wobble bearing axle for use with recumbent human powered vehicles. By providing an apparatus for accessing the muscles of the upper body of a human, the recumbent human powered vehicle will be enabled to ascend upward inclines with more proficiency. The wobble bearing axle will also enable a person to generate more speed through use of the upper body propulsion apparatus. Moreover, the improved recumbent human powered vehicle will be able to disengage the upper body propulsion apparatus by disengaging the lever arms from the axle-wobble bearing assembly. This disengagement mechanism is designed such that no residual drag to the lower body muscles will be accrued thereby.

It is also an object of the present invention to eliminate the need for excessively large wings on a human powered aircraft. By accessing more power from the upper body, a human powered aircraft will be able to take off with greater ease with an extra propeller to be operated by the upper body propulsion apparatus.

It is a further object of the present invention to provide an improved exercise apparatus, which fully utilizes both the upper body and the lower body simultaneously. By accessing both muscle groups in the upper body and the lower body simultaneously a person may be able to burn more calories in a shorter interval of time than an exercise apparatus which engages only the lower body muscles such as the quadriceps, triceps, biceps, and deltoids.

It is a further object of the present invention to provide for a faster and more efficient terrestrial human powered vehicle. This vehicle, would be a recumbent bicycle or tricycle optionally including a fairing for reducing aerodynamic drag. Since recumbent vehicles position a person horizontally with the ground, a person may use the back seat to act as a base with which he may be able to apply more force to the pedals of the vehicle. This vehicle would also provide for a synchronized movement between a person's arms and legs thereby mitigating any discomfort.

It is a further object of the present invention to provide an all-terrain human powered vehicle which is enabled to traverse through mud, sand, elevated terrain, and water by incorporating an upper body propulsion system incorporating a wobble bearing.

DESCRIPTION OF PREFERRED EMBODIMENTS

According to a preferred embodiment of the present invention, a unique apparatus is used to augment the power of a human powered vehicle such as velocipedes by engaging the upper body of a human operator. And in other preferred embodiments, the present invention is used to incorporate the upper body in cardiovascular exercise along with the lower body in a recumbent configuration. The present invention is described in enabling detail below.

For the purpose of the present invention the term "velocipede" shall hereafter refer to any human-powered vehicle which incorporates at least one wheel for propulsion.

FIGS. 1-5 illustrates a preferred embodiment of the present invention. The wobble bearing axle assembly 100 is used for engaging the upper body of a person for use in human powered vehicles and exercise equipment. The wobble bearing assembly converts linear input force derived by the operator into rotational force which is directed toward the forward propulsion of a wheel.

The wobble bearing axle assembly 100 comprises a wobble bearing 101, a wobble axle 102, at least two engagement members 135, 136 a first arm 105 and a second arm 112. The wobble bearing is disposed upon the oblique retainer 175 of the wobble axle 102. The oblique retainer 175 of the wobble axle is angled offset from the axis of the wobble axle Y. The engaging members 135, 136 are rotatably affixed with the first and second arms through pins 125 which is longitudinally disposed through complementary orifices through the first and second arms and the engaging members respectively. In some preferred embodiments additional bearings 108, 109 are engaged with the pedals powered by the legs of the operator.

The wobble bearing assembly 100 is in communication with the linear force apparatus 150. The linear force assembly 150 includes a center arm 121 an alpha arm 126, a beta arm 127, a first member 107, a second member 110, a first elbow 111, and a second elbow 106. The alpha arm is pivotally connected with the first member through a first pin 122. The beta arm 127 is pivotally connected with the second member 110 through the second pin 124. The first elbow 111 is pivotally connected with the first member through the third pin 175. The second elbow 106 is pivotally connected with the second member 110 through the fourth pin 123. The first arm 105 and the second arm 112 of the wobble bearing axle assembly is pivotally connected with the linear force apparatus 150 through an alpha pin 123.

Figure 1:
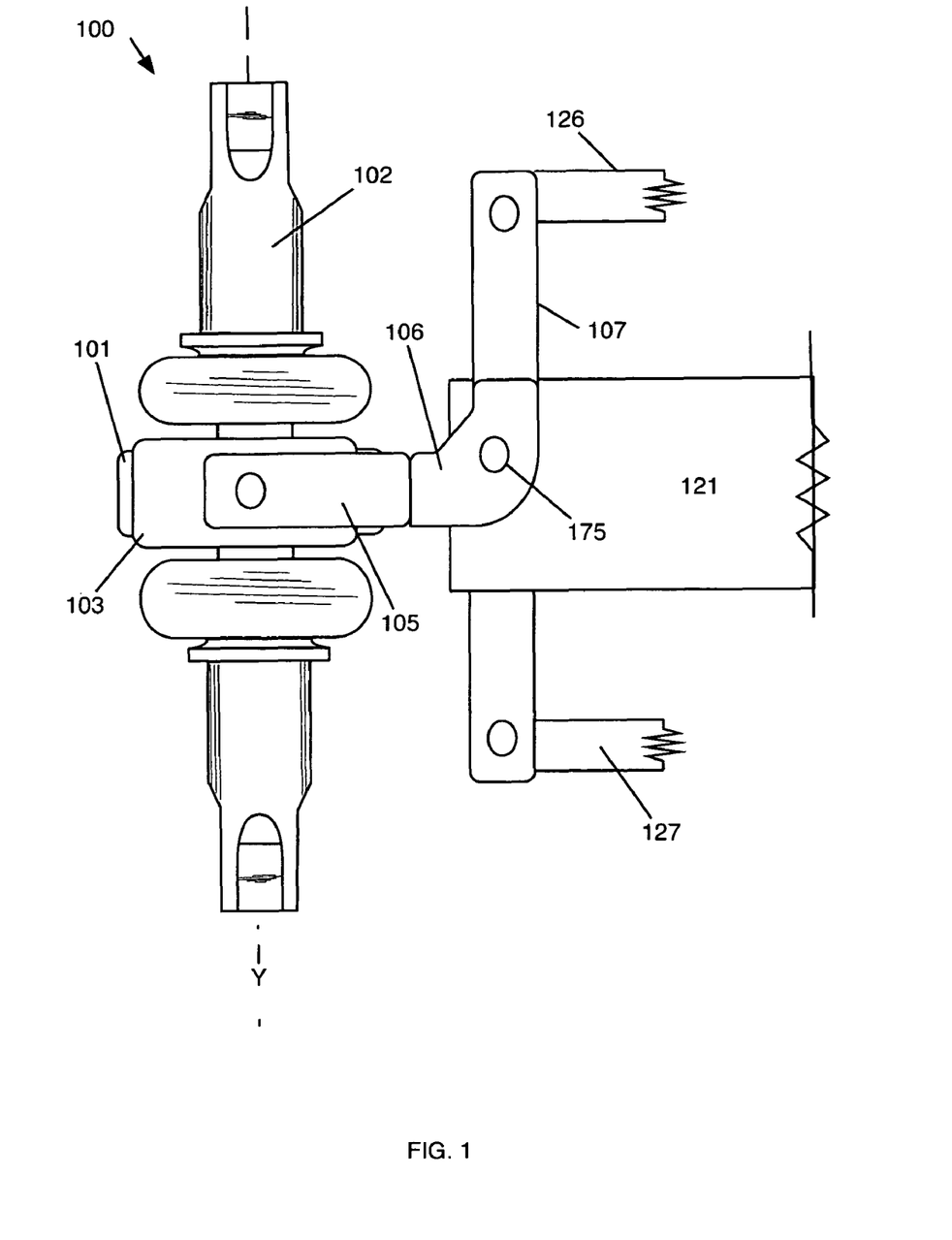
FIG. 1 is a plan view of a preferred embodiment of the present invention.
Figure 2:
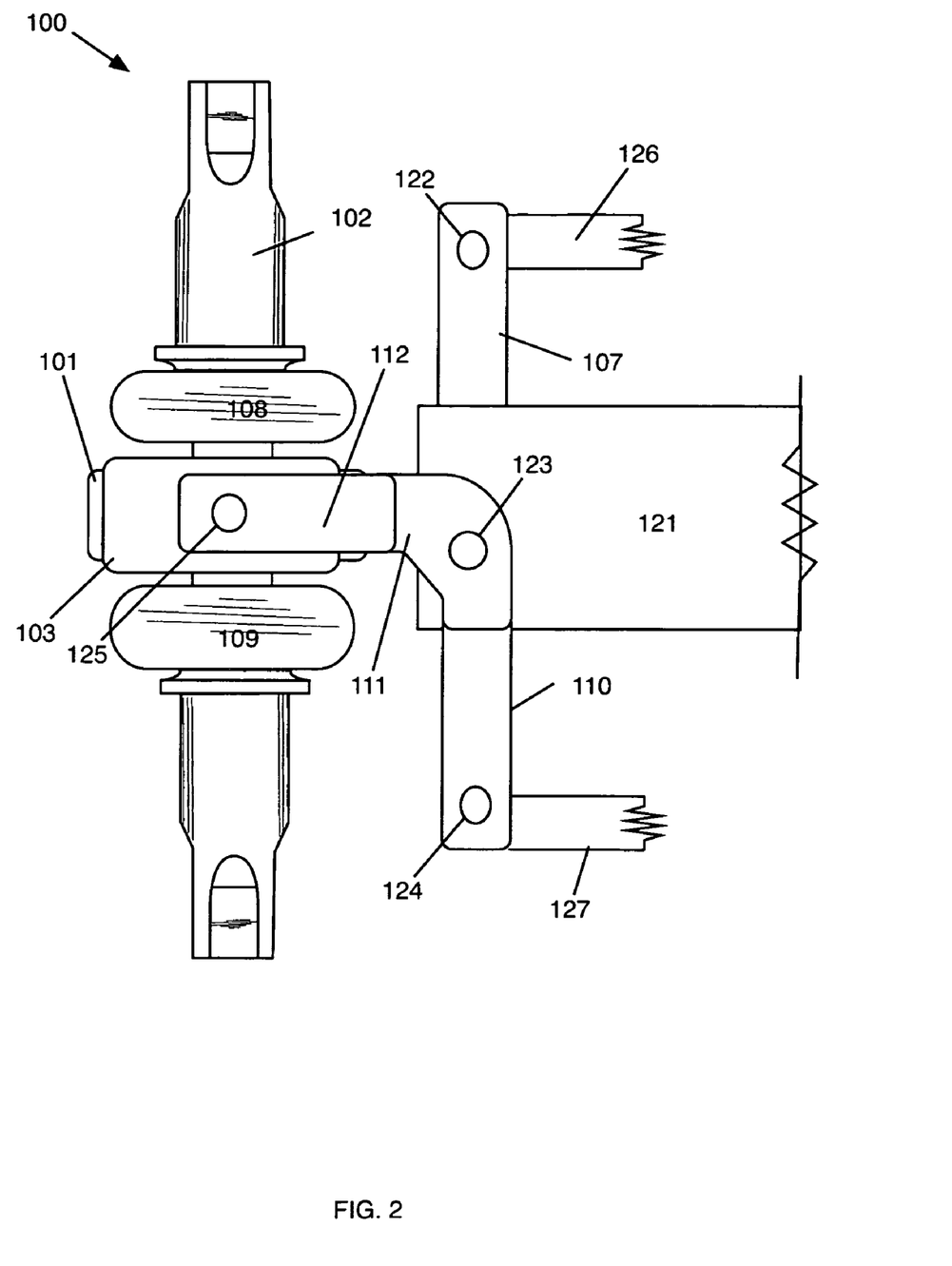
FIG. 2 is a plan view of a preferred embodiment of the present invention.
Figure 3:
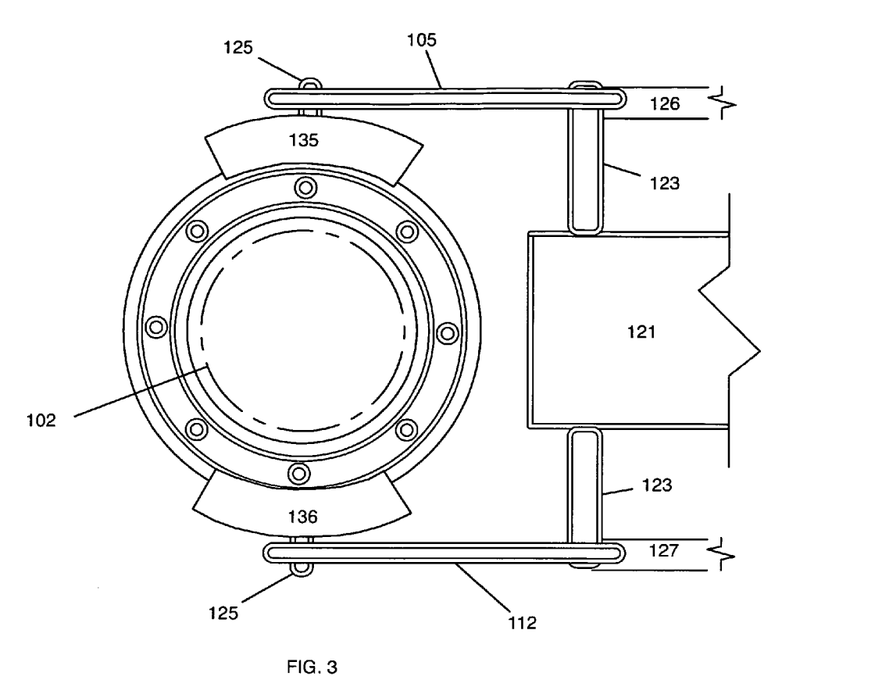
FIG. 3 is a frontal of a preferred embodiment of the present invention.
Figure 4:
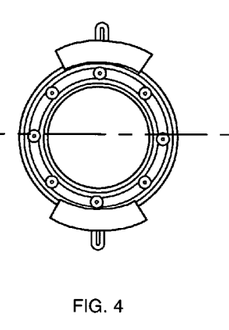
FIG. 4 is a frontal of a preferred embodiment of the present invention
Figure 5:
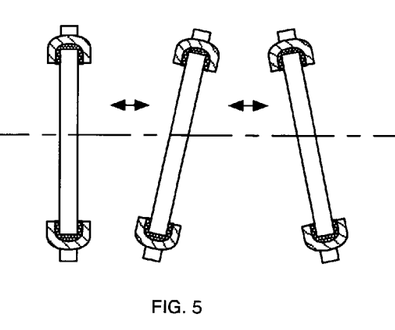
FIG. 5 is a side of a preferred embodiment of the present invention.
Figure 6:
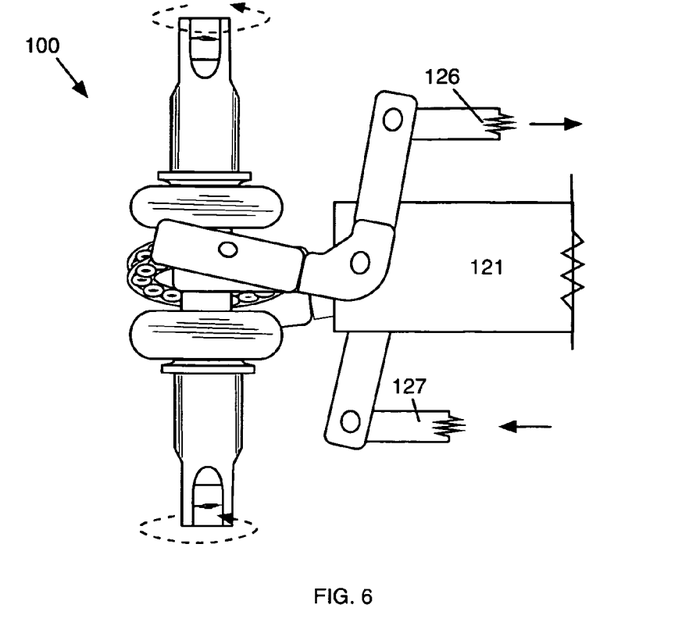
FIG. 6 is a plan of a preferred embodiment of the present invention.
Figure 7:
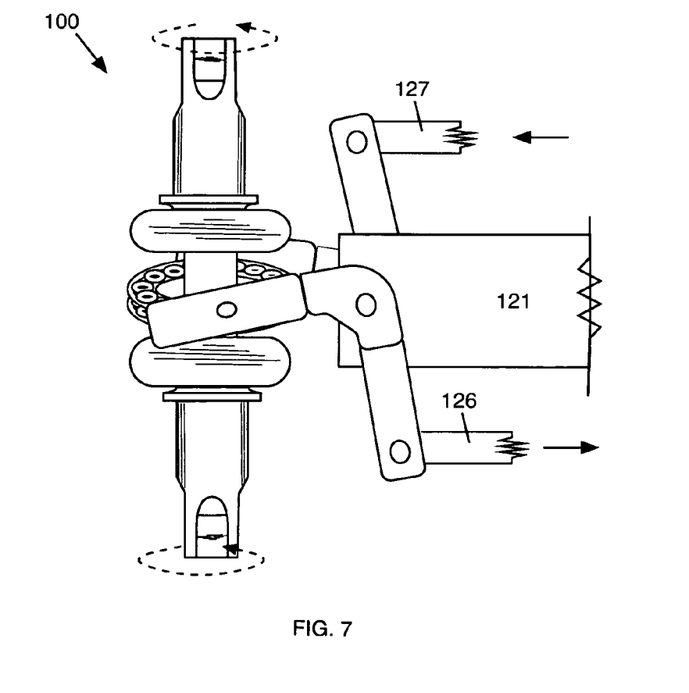
FIG. 7 is a plan of a preferred embodiment of the present invention.
Figure 8:
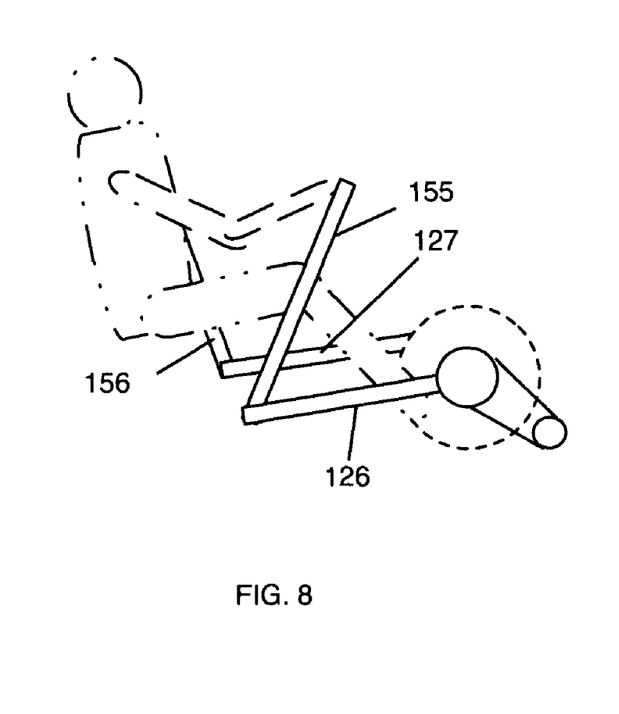
FIG. 8 is a side of a preferred embodiment of the present invention.
Figure 9:
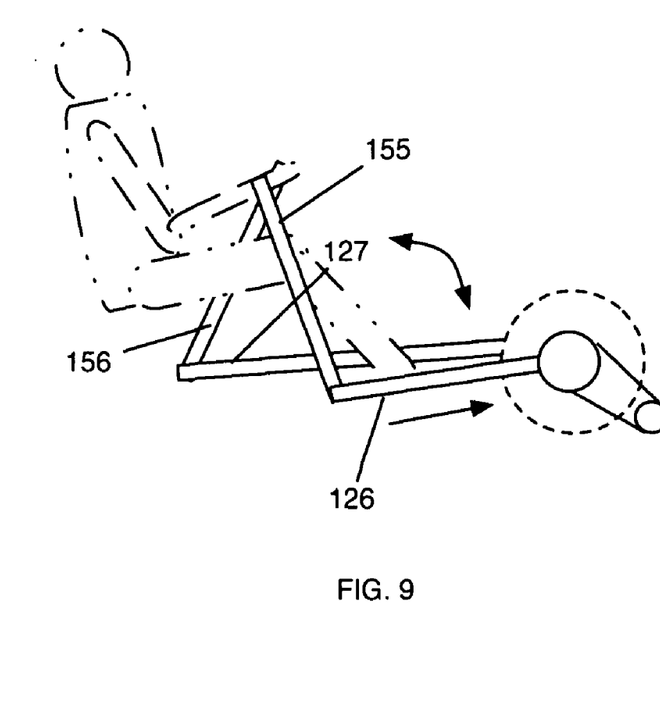
FIG. 9 is a side of a preferred embodiment of the present invention.
Figure 10:
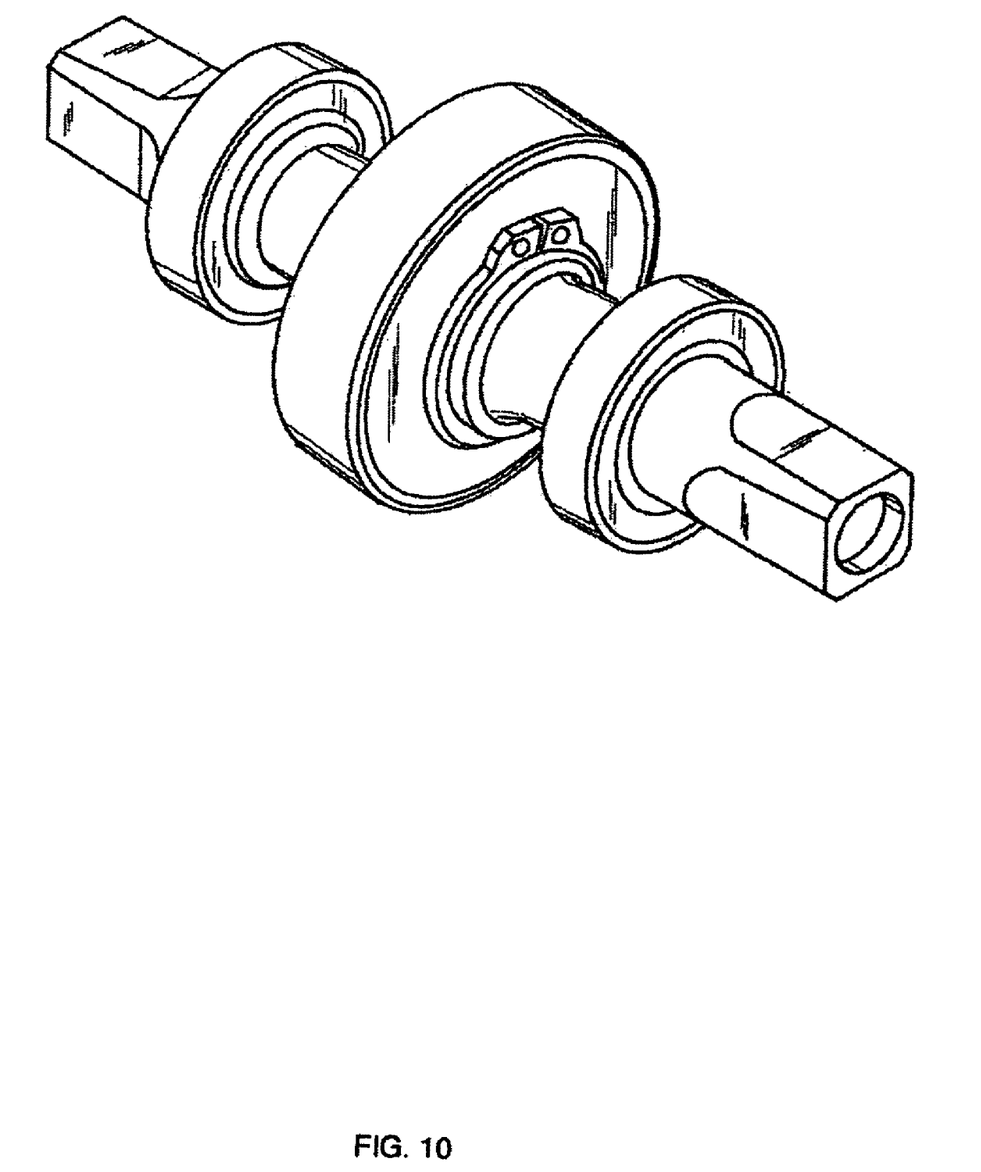
FIG. 10 is a perspective of a preferred embodiment of the present invention.
Figure 11:
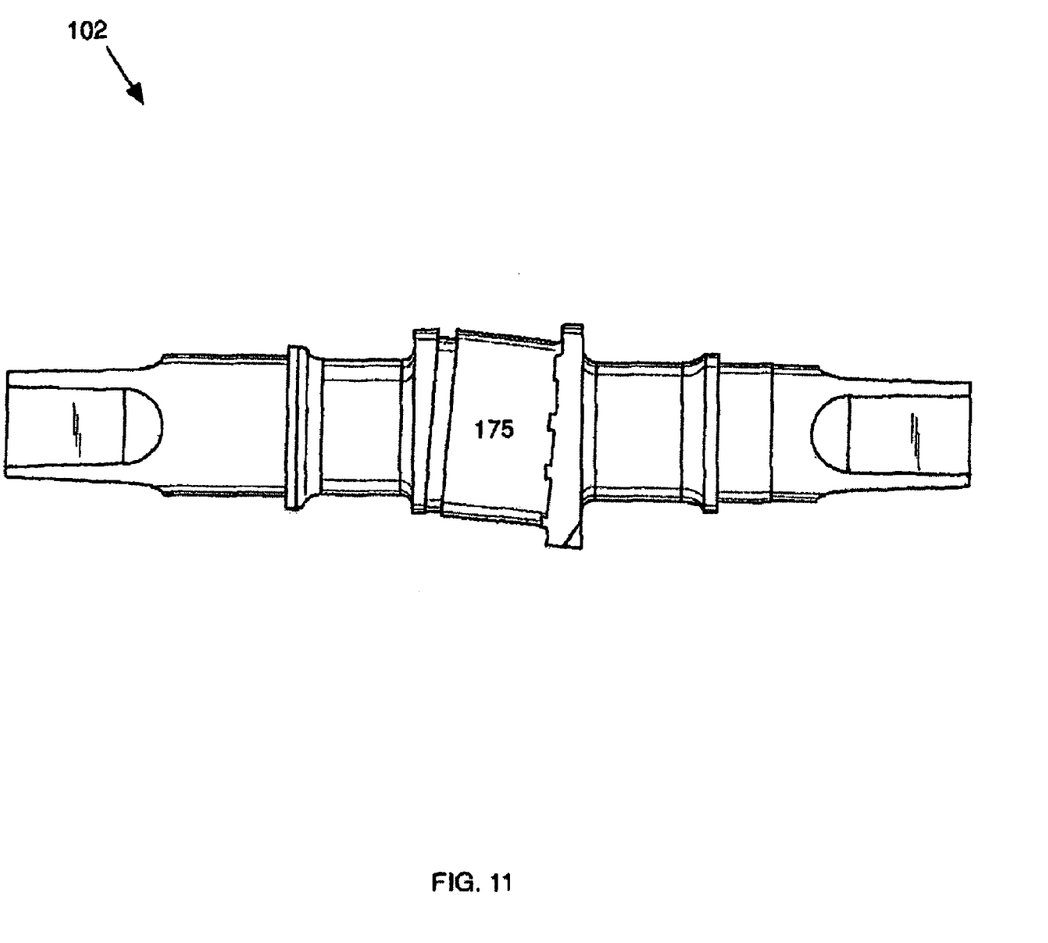
FIG. 11 is a plan of a preferred embodiment of the present invention.
Figure 12:
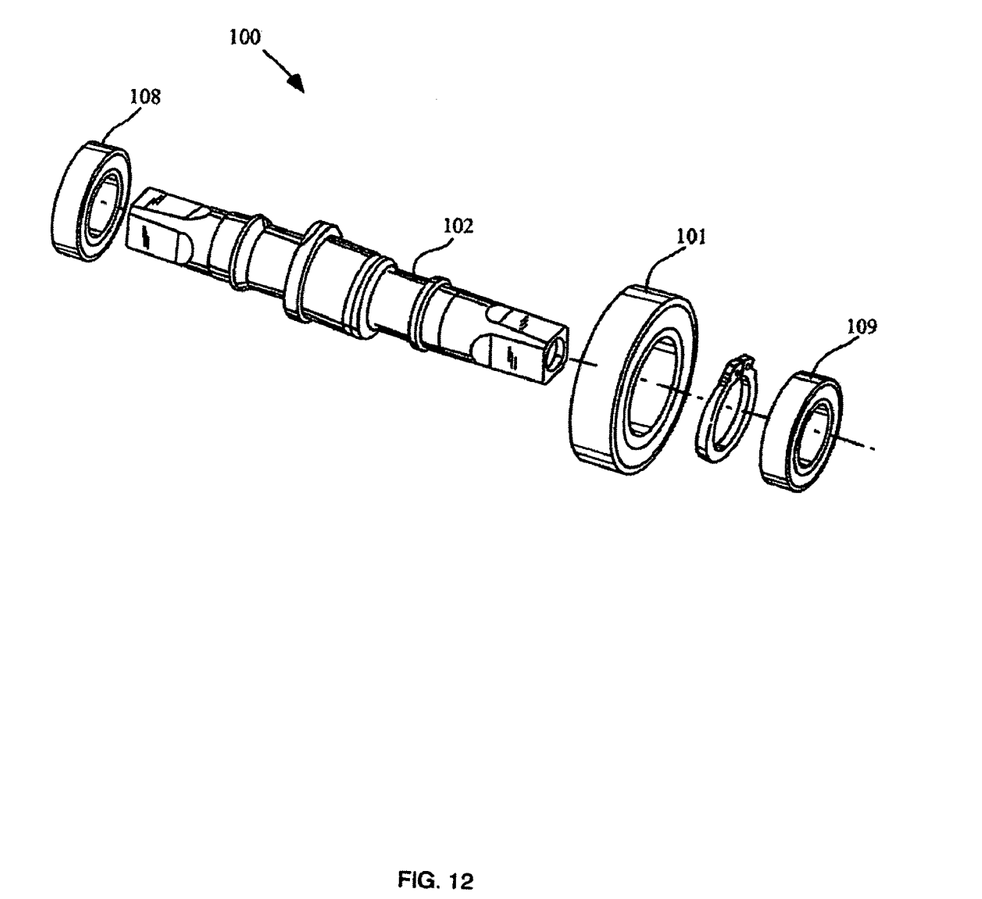
FIG. 12 is an exploded view of a preferred embodiment of the present invention.
Figure 13:
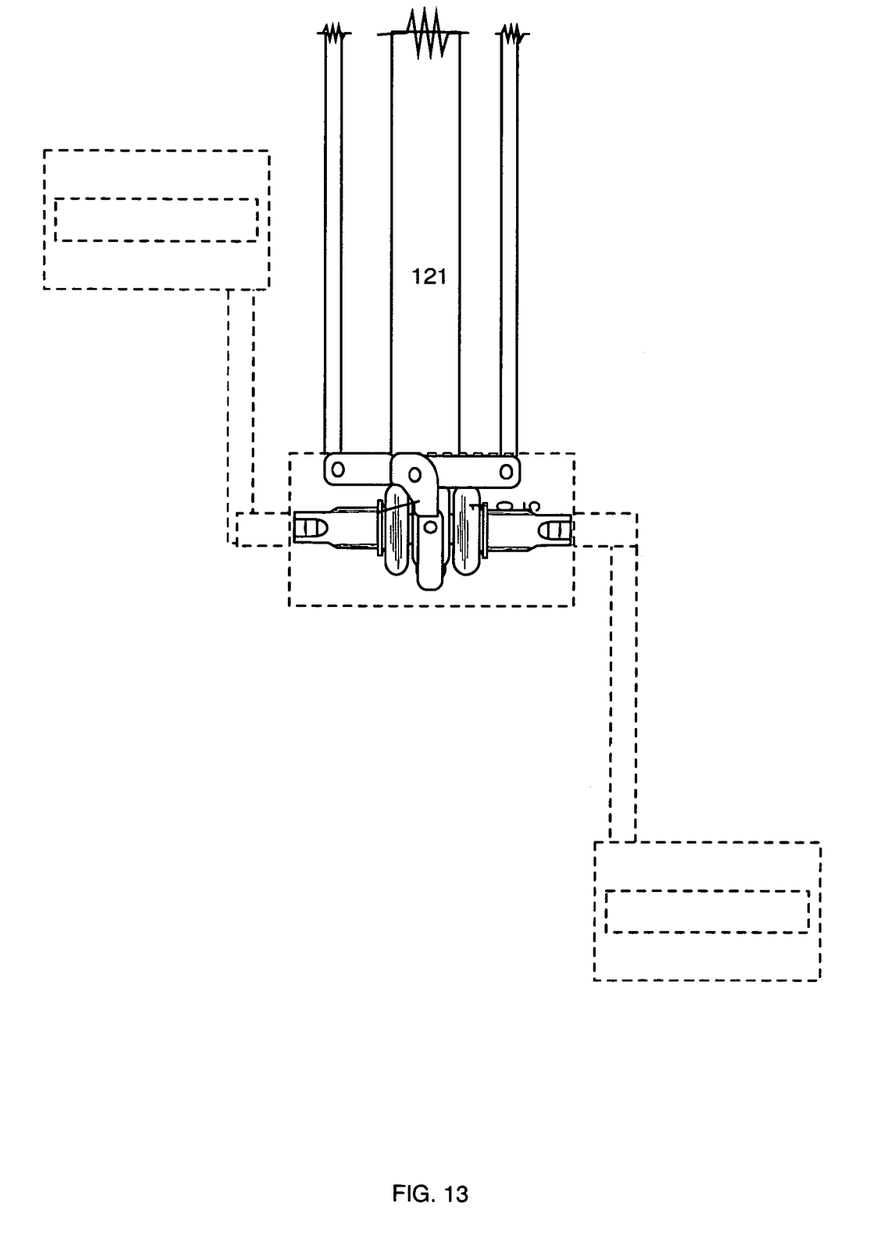
FIG. 13 is a plan of a preferred embodiment of the present invention.
Figure 14:
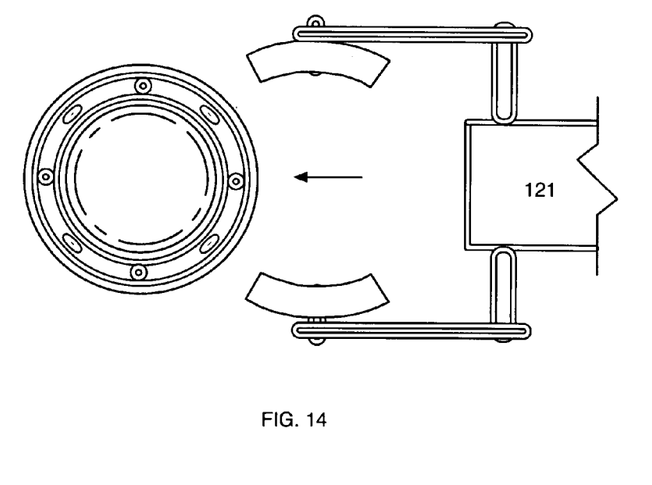
FIG. 14 is a frontal of a preferred embodiment of the present invention.
Figure 15:
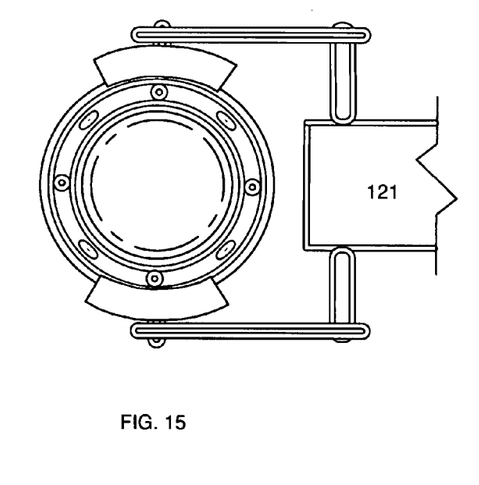
FIG. 15 is a frontal of a preferred embodiment of the present invention.
Figure 16:
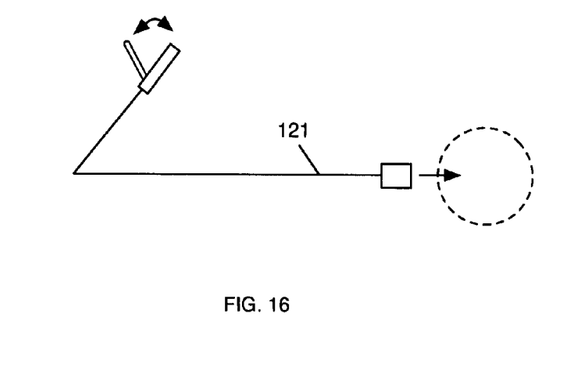
FIG. 16 is a side of a preferred embodiment of the present invention.
Figure 17:
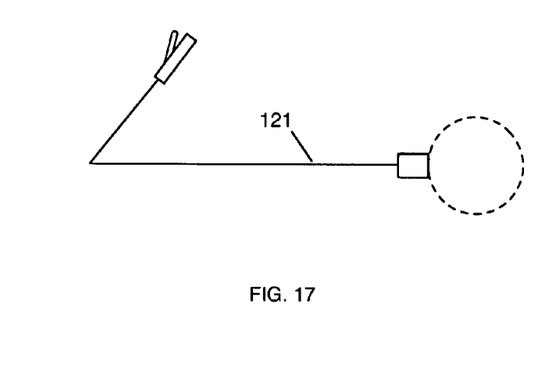
FIG. 17 is a side of a preferred embodiment of the present invention.

FIGS. 5-9 illustrate that in operation the operator forces the wobble bearing to move back and forth by pushing and pulling on handle bars 155, 156 respectively. Handle bars 155, 156 are in communication with the alpha and beta arms respectively 126, 127. As illustrated in FIGS. 6-7, the alpha and beta arms rotate the wobble bearing. This rotation of the wobble bearing 101 results in rotational movement of the wobble axle 102. This is due to the oblique angle of the wobble axle 102.

FIGS. 14-17 illustrate that in some preferred embodiments the wobble bearing assembly 100 may further include an engagement system 300. The engagement system is comprised of a first shaft 301 and a second shaft 302. The first shaft 301 and the second shaft 301 are pivotally connected with each other. As the first stick and the second stick are pulled towards each other by the operator, the center arm 121 is horizontally translated in order to bring into contact the engagement members 135, 136 with the wobble bearing 101.

Figure 18:
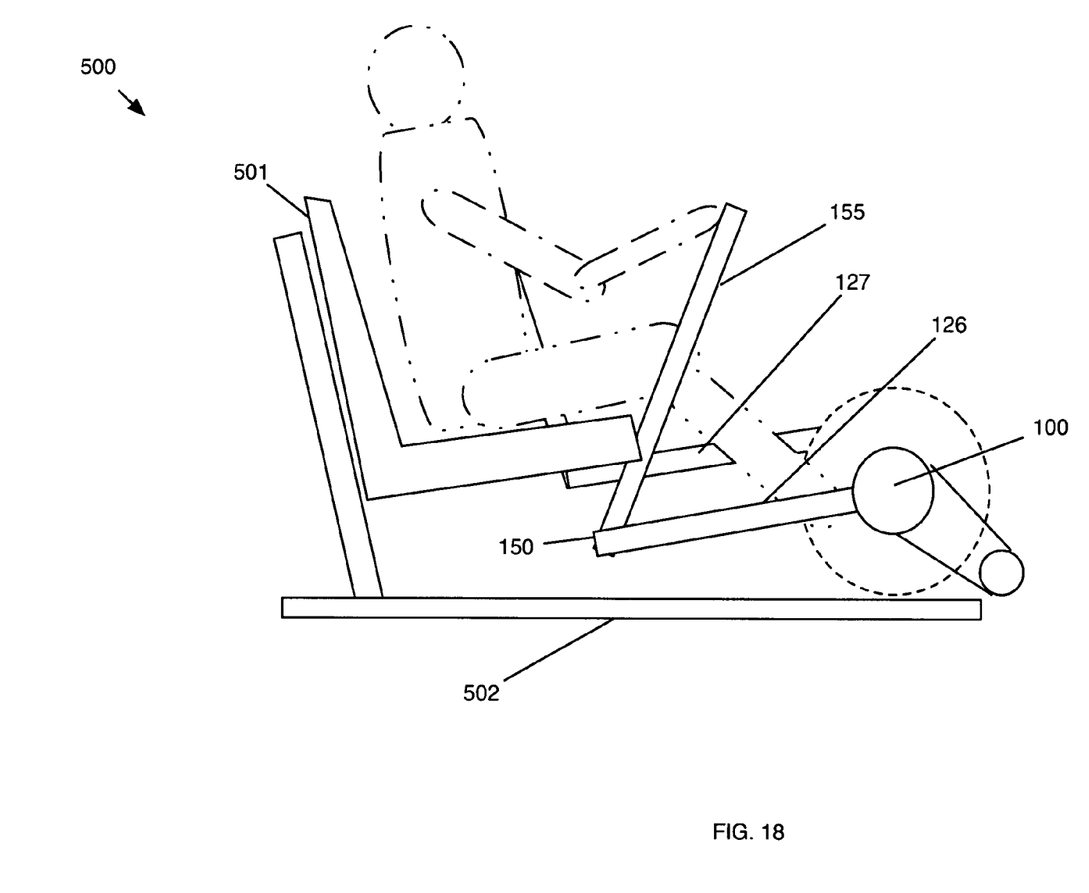
FIG. 18 is a side of a preferred embodiment of the present invention.
Figure 19:
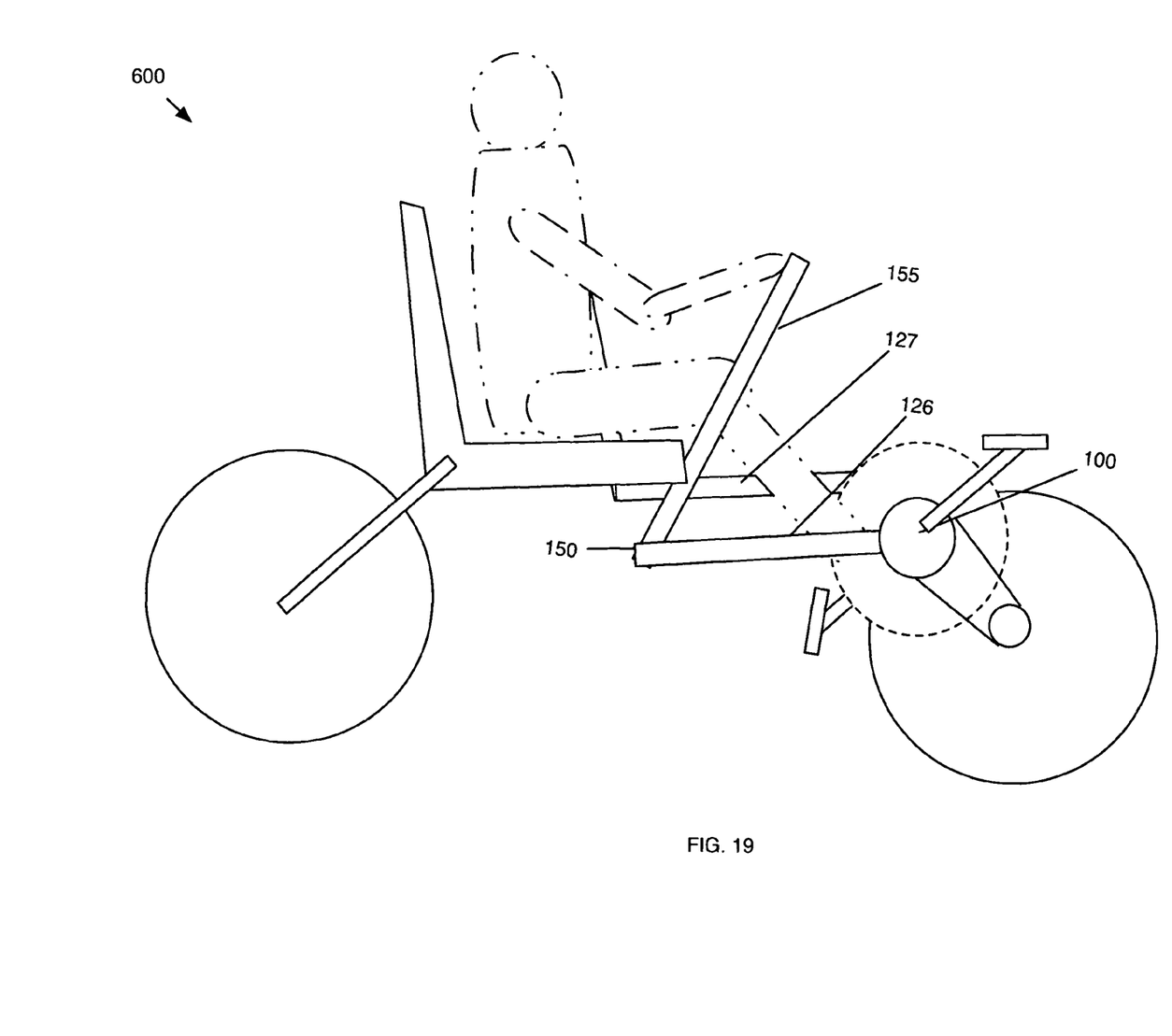
FIG. 19 is a side of a preferred embodiment of the present invention.

FIG. 18 illustrates that in some preferred embodiments the wobble bearing axle assembly 100 may be incorporated into an exercise apparatus such as a recumbent cycle 500. The recumbent cycle 500 is comprised of a bearing axle assembly 100, a linear force apparatus 150, a seat 501, and a base 502. FIG. 19 also illustrates another preferred embodiment wherein the bearing axle assembly 100 may be incorporated into an improved recumbent velocipede 600. As with the recumbent cycle the recumbent velocipede 600 includes a bearing axle assembly 100, a linear force apparatus 150, as well as the typical parts, which form a typical recumbent velocipede.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. The wobble bearing axle assembly comprises:
   a wobble bearing, a wobble axle, and at least two engagement members;
   the wobble axle is an elongate member comprising an oblique retainer;
   the oblique retainer of the wobble axle is angled offset from the axis of the wobble axle;
   the wobble bearing is disposed upon the oblique retainer of the wobble axle;
   the engaging members are in communication with the wobble bearing.

2. The wobble bearing axle assembly of claim 1 further comprising:
   a first arm, a second arm, and a center arm;
   the first arm and the second arm are in communication with the engagement members.

3. The wobble bearing axle assembly of claim 2 further comprising:
   an alpha arm, a beta arm, a first member, a second member, a first elbow, and a second elbow;
   the alpha arm is pivotally connected with the first member;
   the beta arm is pivotally connected with the second member;
   the first elbow is pivotally connected with the first member;
   the second elbow is pivotally connected with the second member.

4. The wobble bearing axle assembly of claim 3 further comprising handle bars;
   the handle bars are in communication with the alpha and beta arms respectively.

5. The wobble bearing axle assembly of claim 4 further comprising an engagement system;
   the engagement system is comprised of a first shaft and a second shaft;
   the first shaft and the second shaft are pivotally connected with each other;
   as the first shaft and the second shaft are pulled towards each other by the operator;
   the center arm is horizontally translated towards the wobble bearing in order to bring into contact the engagement members.

* * * * *